US009055621B2

(12) United States Patent
Shrubsole

(10) Patent No.: US 9,055,621 B2
(45) Date of Patent: Jun. 9, 2015

(54) ACTIVITY ADAPTED AUTOMATION OF LIGHTING

(75) Inventor: Paul Shrubsole, Arnhem (NL)

(73) Assignee: Koninklijke Philips N.V., Eindhoven (NL)

( * ) Notice: Subject to any disclaimer, the term of this patent is extended or adjusted under 35 U.S.C. 154(b) by 535 days.

(21) Appl. No.: 13/383,666

(22) PCT Filed: Jul. 8, 2010

(86) PCT No.: PCT/IB2010/053129
§ 371 (c)(1), (2), (4) Date: Jan. 12, 2012

(87) PCT Pub. No.: WO2011/007299
PCT Pub. Date: Jan. 20, 2011

(65) Prior Publication Data

US 2012/0116544 A1 May 10, 2012

(30) Foreign Application Priority Data

Jul. 15, 2009 (EP) .................................... 09165494

(51) Int. Cl.
*G05B 11/01* (2006.01)
*G05B 15/00* (2006.01)
(Continued)

(52) U.S. Cl.
CPC ............ *H05B 37/02* (2013.01); *H05B 37/0227* (2013.01)

(58) Field of Classification Search
CPC ............................ H05B 37/02; H05B 37/0227
USPC .................... 700/9, 12, 17, 83; 315/292, 294; 340/4.31, 540, 573.1
See application file for complete search history.

(56) References Cited

U.S. PATENT DOCUMENTS 6,756,998 B1 * 6/2004 Bilger ........................... 715/764
6,909,921 B1 * 6/2005 Bilger ............................ 700/19
(Continued)

FOREIGN PATENT DOCUMENTS

EP 1931180 A1 6/2008
JP 05121175 A 5/1993
(Continued)

OTHER PUBLICATIONS

Martijn H. Vastenburg et al., "A user experience-based approach to home atmosphere control", Created@ [Apr. 2, 2009 11:11:23 AM]; Refer Portions [Highlighted].
(Continued)

*Primary Examiner* — Robert Fennema
*Assistant Examiner* — Jennifer L Norton
(74) *Attorney, Agent, or Firm* — Meenkashy Chakravorty

(57) ABSTRACT

An automation system for providing activity-adapted automation in an environment, comprising at least one controllable appliance (1), and a sensor (3) arranged to collect sensor data associated with user activities in the environment. A controller includes a user behavior analyzer (6), arranged to recognize, based on the sensor data, user activities and to identify unique combinations of simultaneously performed activities, and a user interface (4), arranged to display the unique combinations of simultaneously performed activities and representations of the predefined automation settings, and to allow the user to associate each unique combination with a desired setting. The controller is further adapted to subsequently control the appliance according to the predefined automation setting associated with a currently recognized combination of user activities. This provides activity-based automation of the environment, in accordance with preprogrammed preferences of the user, without requiring any programming experience.

8 Claims, 2 Drawing Sheets

(51) Int. Cl.

| | |
|---|---|
| ***G05B 15/02*** | (2006.01) |
| ***G05B 19/02*** | (2006.01) |
| ***G08B 21/00*** | (2006.01) |
| ***G08B 23/00*** | (2006.01) |
| ***H05B 37/02*** | (2006.01) |

(56) References Cited

U.S. PATENT DOCUMENTS

| | | | | |
|---|---|---|---|---|
| 6,912,429 | B1 * | 6/2005 | Bilger | 700/19 |
| 2002/0014972 | A1 | 2/2002 | Danielson et al. | |
| 2003/0122507 | A1 * | 7/2003 | Gutta et al. | 315/292 |
| 2006/0071605 | A1 * | 4/2006 | Diederiks | 315/76 |
| 2008/0122635 | A1 * | 5/2008 | Fujikawa et al. | 340/573.1 |
| 2009/0008056 | A1 | 1/2009 | Helanto | |
| 2009/0080526 | A1 | 3/2009 | Vasireddy et al. | |
| 2009/0171478 | A1 * | 7/2009 | Wong | 700/13 |
| 2014/0305352 | A1 * | 10/2014 | Dowling et al. | 109/38 |

FOREIGN PATENT DOCUMENTS

| | | | |
|---|---|---|---|
| JP | 05217677 | A | 8/1993 |
| JP | 8007188 | B2 | 1/1996 |
| JP | 2003004278 | A | 1/2003 |
| JP | 2005513754 | A | 5/2005 |
| WO | 2004049767 | A1 | 6/2004 |
| WO | 2006038169 | A1 | 4/2006 |
| WO | 2007113737 | A1 | 10/2007 |
| WO | 2008146232 | A1 | 12/2008 |

OTHER PUBLICATIONS

"For sale: Mood Tuscany for your living room", Created@[Apr. 2, 2009 3:05:45 PM]; Refer Portions [Highlighted].

* cited by examiner

ACTIVITY ADAPTED AUTOMATION OF LIGHTING

FIELD OF THE INVENTION

The present invention relates to an automated activation system for providing activity-adapted automation in an environment. In particular, the present invention relates to a lighting system for providing activity-based control of a light atmosphere.

BACKGROUND OF THE INVENTION

A general problem with activity-adapted automation is that users either have very limited control to personalize the conditions by which appliances in their environment are automated, or they have overwhelmingly complex controls that are beyond most users' ability and willingness to use.

Recently, efforts have been made to provide lighting systems that automatically adapt the lighting of an environment to the mood or activity of a user present in the environment. An example is disclosed in WO 2008/146232, where a lighting device is adapted to provide alternatively mood, ambience or atmosphere lighting.

However, the system according to WO 2008/146232 still does not enable a satisfactory user interaction.

SUMMARY OF THE INVENTION

It is an object of the present invention to at least partially overcome this problem, and to provide an automation system, and a controller for use in such a system, which adapt automation of appliances to user activities, without requiring complex programming by the user.

This and other objects are achieved by an automation system and controller for providing activity-adapted automation in an environment, the system comprising at least one controllable appliance, the controller, connected to the appliance and arranged to control the appliance in accordance with a plurality of predefined automation settings, at least one sensor, connected to the controller and arranged to collect sensor data associated with user activities in the environment. The controller includes a user behavior analyzer, arranged to recognize, based on the sensor data, user activities and to identify unique combinations of simultaneously performed activities, and a user interface, arranged to display the unique combinations of simultaneously performed activities and representations of the predefined automation settings, and to allow the user to associate each unique combination with a desired setting. The controller is adapted to subsequently control the appliance according to the predefined automation setting associated with a currently recognized combination of user activities.

The system and controller according to the present invention thus allow a user to match activities recorded by an activity detection system with a desired automation. When the controller subsequently recognizes a combination of activities, the automation associated with this combination is activated, so that no additional control device is necessary to automate the appliance.

This provides an activity-based automation of the environment, in accordance with rules set by the user, without requiring any programming experience.

The activities may be e.g. sitting and reading, lying down and playing music, exercising, etc. Note that the activities may include activities by multiple users present in the environment. The environment may be a home, an office, a public area, etc.

The advantages of the present invention are not restricted to any particular type of automation, since the invention is suitable in any situation where activity-adapted automation is desired. The appliance may be any technical system influencing the user environment, such as lighting, ventilation, air conditioning or heating. It may also be a consumer lifestyle product, such as audio/visual equipment (TV, radio, etc) or cooking equipment (coffee machine, stove, etc.).

A memory preferably stores newly identified unique combinations of user activities for future presentation to the user, thus allowing a user to later associate such a combination with an automation setting. This ensures that a user is given the opportunity to associate any identified combination of activities with a desired automation setting. Here combinations are interpreted by the system as logical conjunctions to form rules for automation.

According to a particular embodiment, the appliance is a luminaire, and the predefined settings are predefined light atmosphere settings. This provides activity-based illumination of the environment, in accordance with preprogrammed preferences of the user.

The present invention also relates to a method of providing activity-adapted automation in an environment, comprising:

collecting sensor data associated with user activities in the environment, based on the sensor data, recognizing user activities, identifying unique combinations of simultaneously performed activities, displaying on a user interface the unique combinations of simultaneously performed activities and representations of a plurality of predefined automation settings, using the user interface, associating each unique combination with a desired setting, and subsequently controlling an appliance according to a predefined automation setting associated with a currently recognized combination of user activities.

It is noted that the invention relates to all possible combinations of features recited in the claims.

BRIEF DESCRIPTION OF THE DRAWINGS

These and other aspects of the present invention will now be described in more detail, with reference to the appended drawings showing a currently preferred embodiment of the invention.

DETAILED DESCRIPTION

The present invention will now be described with reference to a lighting system in a home environment. However, as mentioned, the invention is likewise advantageous in combination with other automation systems in a variety of user environments.

Figure 1:
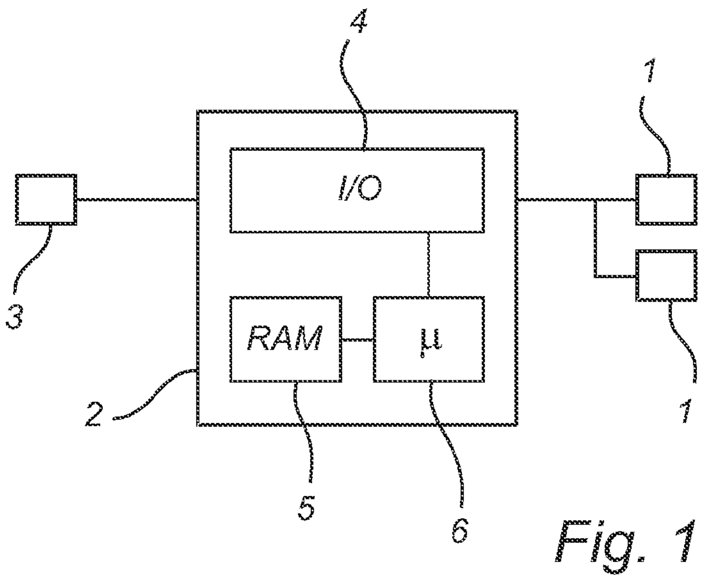
FIG. 1 shows a system according to an embodiment of the present invention.

The system in FIG. 1 comprises a set of luminaires 1, a controller 2 connected to the luminaires, and a set of sensors 3 connected to the controller. The sensors 3 may be connected as a sensor network, and may comprise various sensor types, such as motion detectors, vision systems, pressure sensors, electrical power indicators, light detectors and sound detectors. The sensors collect various sensor data, possibly including low level sensor data as well as high level sensor data, such as presence of a user at a location, pressure on a surface, depression of a surface, power status of consumer appliances, etc. The controller comprises a user interface 4 and a memory 5 for storing predefined settings of light atmospheres that can be provided by the luminaires 1. The controller further comprises a user behavior analyzer 6, arranged to receive sensor data from the sensors 3, and to recognize high level user activities, based on the sensor data.

Note that the logical units of the controller illustrated in FIG. 1, i.e. the interface 4 and the analyzer 6, not necessarily are integrated in the same physical unit, but may be distributed in the overall system architecture. For example, the analyzer 6 may be integrated in one or several sensors 3, thus providing the analysis of sensor data immediately when acquiring it. The interface 4 may be provided as a function in any control panel.

In use, the sensors 3 collect sensor data relating to low level events, such as load of chair or bed, activation of stereo, etc. The analyzer takes the sensor data as input, and determines what activities the user is currently undertaking, such as lying on the bed listening to music. For example, the analyzer 6 may recognize that a user is sitting down when receiving sensor data indicating pressure applied to the surface of a chair, and that a user is lying down, when receiving sensor data indicating pressure applied to a large area of a bed. The analyzer 6 may also provide various types of data processing, such as image processing of data from a camera, sound processing of data from a sound detector, in order to determine what activities are being performed in the environment.

The currently performed activities form a unique combination, which is identified by the analyzer 6. The combination of activities is stored in memory 5, e.g. in an "activity history list". This list is accessible via the user interface 4, on which a user may associate a stored activity combination with a light atmosphere setting. This may be desired when an activity combination is encountered for the first time, or when desiring to replace an existing association.

Further, on recognizing a stored combination of activities, the controller 6 searches the memory 5 for a light atmosphere setting that has been associated with this combination, and, if found, provides this setting to the controller 2, which controls the luminaire 1 to provide this light atmosphere.

Figure 2:
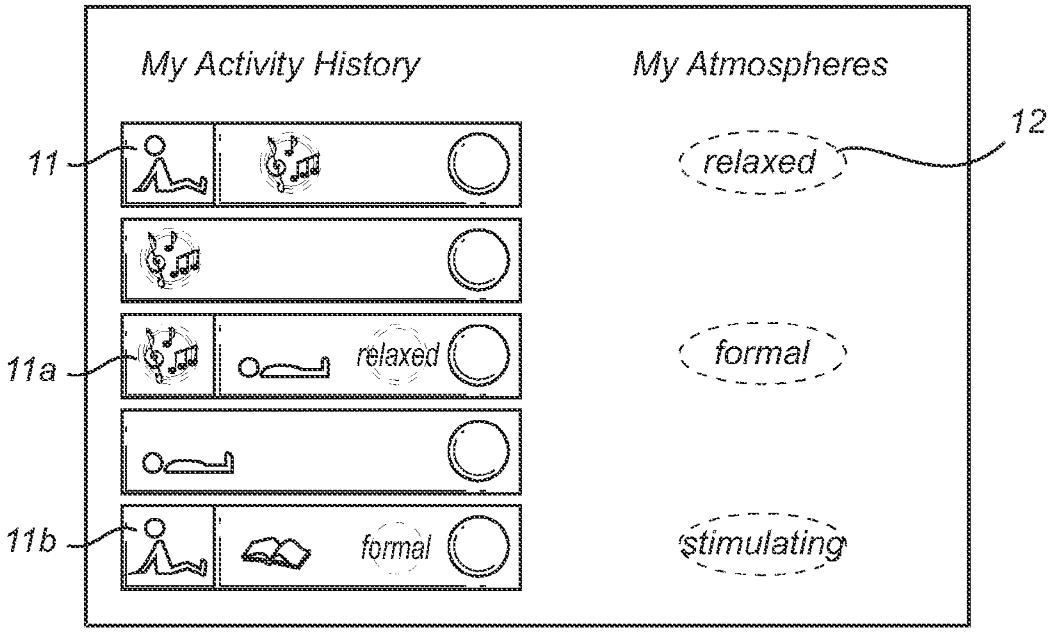
FIG. 2 shows a screen shot of the user interface in the system in FIG. 1.

FIG. 2 shows a screenshot of the interface 4 which is used to make associations (rules) between activities and atmospheres.

The left side is a set of representations, or icons 11, representing identified unique combinations of detected activities. Each time a new activity is detected, such as sitting, lying down, playing music, etc, the analyzer 6 determines whether a new combination has occurred. A new activity may invalidate a previous activity (e.g. sitting invalidates standing), but may also combine with a previous activity (e.g. sitting may be combined with playing music).

Activity combinations with mutually exclusive activities must be represented by different icons 11. If a new activity does not invalidate any of the current activities, it may be combined with the previous activities as a new combined activity. The former combination may be maintained as a separate combination, at least if this combination has had a minimum duration.

As an example, consider a user who first sits down in a chair, then starts the CD player, then lies down, and then turns off the CD player. This may result in four unique combinations of activities: sitting; sitting and listening; lying down and listening; lying down.

The right side of the interface 4 displays icons 12 representing a plurality of preset lighting atmospheres, here illustrated by relaxed, formal and stimulating. The interface 4 is arranged to allow the user to program when a preset lighting atmosphere should be activated, by simply associating a combination of activities that has been previously performed in the list on the left with the desired atmosphere offered in the list on the right. The association can be made by a standard "drag-and-drop", where the user drags one of the activity icons 11 to one of the atmosphere icons 12 or vice-versa. In FIG. 2, icon 11*a* has been associated with the atmosphere "relaxed", while icon 11*b* has been associated with the atmosphere "formal".

The next time the controller 2 identifies the same activity combination, it will control the luminaires 1 to provide the lighting atmosphere that has been associated with this activity combination.

Figure 3:
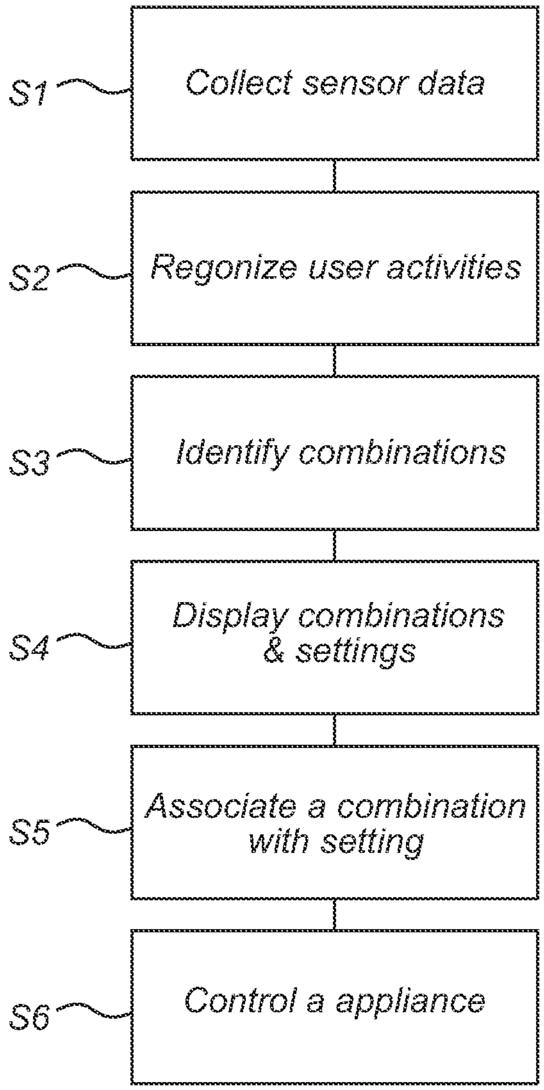
FIG. 3 shows a schematic flowchart of a method according to an embodiment of the present invention.

FIG. 3 illustrates the procedure described above. First, in step S1, sensor data is received from the sensors 3. Then, in step S2, the user behavior analyzer 6 recognizes user activities based on the sensor data, and identifies combinations of activities in step S3. In step S4, the combinations and different automation setting (here light atmosphere settings) are displayed, and in step S5 the interface 4 is used to associate a combination with a setting. Finally, in step S6, the controller 2 controls the appliance 1 (luminaire) in accordance with the setting associated with the current activity combination.

The person skilled in the art realizes that the present invention by no means is limited to the preferred embodiments described above. On the contrary, many modifications and variations are possible within the scope of the appended claims. For example, the user interface may take on any number of appearances, as long as it provides the functionality described herein.

The invention claimed is:

1. A controller for use in an automation system for providing activity-adapted automation in an environment, said system comprising:

at least one controllable appliance, said controller connected to said appliance and arranged to control the appliance in accordance with a plurality of predefined automation settings, at least one sensor connected to said controller and arranged to collect sensor data associated with user activities in said environment, said controller including:

a user behavior analyzer arranged to recognize, based on said sensor data, a plurality of the user activities and to identify unique combinations of simultaneously performed activities, wherein the user behavior analyzer is configured to include in said identified unique combinations a new user activity of said plurality of the user activities combined with at least one previous user activity of said plurality of the user activities in response to determining that said new user activity does not invalidate said at least one previous user activity; and a user interface arranged to display said unique combinations of simultaneously performed activities and representations of said predefined automation settings, and to allow a user to associate each unique combination with a desired setting;

said controller being adapted to subsequently control said appliance according to the predefined automation setting associated with a currently recognized combination of user activities.

2. The controller according to claim 1, wherein the controller further comprises a memory for storing unique combinations of simultaneously performed activities that are not associated with any predefined automation setting for subsequent display on the user interface.

3. The controller according to claim 1, wherein said user interface is adapted to display a first set of representations representing said unique combinations of activities and a second set of representations representing said predefined automation settings, and to allow a user to associate a representation in said first set with a representation in the second set.

4. The automation system recited in claim 1, comprising:

the at least one controllable appliance;

the controller; and the at least one sensor.

5. The automation system according to claim 4, wherein the controllable appliance is a luminaire, and wherein said predefined settings are predefined light atmosphere settings.

6. The automation system according to claim 4, wherein said at least one sensor comprises at least one of a pressure sensor, a vision system, a light detector, a motion detector, a power indicator and a sound detector.

7. A method of providing activity-adapted automation in an environment, comprising:

collecting sensor data associated with user activities in said environment;

based on said sensor data, recognizing a plurality of the user activities;

identifying unique combinations of simultaneously performed activities, wherein the identifying comprises including in said identified unique combinations a new user activity of said plurality of the user activities combined with at least one previous user activity of said plurality of the user activities in response to determining that said new user activity does not invalidate said at least one previous user activity;

displaying on a user interface said unique combinations of simultaneously performed activities and representations of a plurality of predefined automation settings;

using said user interface, associating each unique combination with a desired setting; and subsequently controlling an appliance according to a predefined automation setting associated with a currently recognized combination of user activities.

8. The method according to claim 7, wherein said displaying comprises displaying a first set of representations representing said unique combinations of activities and a second set of representations representing said predefined automation settings, and allowing a user to associate a representation in said first set with a representation in the second set.

* * * * *